United States Patent [19]
Chen

[11] Patent Number: 5,407,281
[45] Date of Patent: Apr. 18, 1995

[54] SELF-REPLENISHING HYDRODYNAMIC BEARING

[75] Inventor: Shuo-Hao Chen, Fremont, Calif.

[73] Assignee: Quantum Corp., Milpitas, Calif.

[21] Appl. No.: 278,805

[22] Filed: Jul. 22, 1994

[51] Int. Cl.⁶ ............................................. F16C 32/06
[52] U.S. Cl. .................................... 384/107; 384/114; 384/123
[58] Field of Search ............... 384/100, 107, 112, 114, 384/115, 118, 120, 121, 123, 292

[56] References Cited

U.S. PATENT DOCUMENTS

| | | | |
|---|---|---|---|
| 3,602,555 | 8/1971 | Hendler | 384/115 |
| 3,870,382 | 3/1975 | Reinhoudt | 384/123 |
| 4,557,610 | 12/1985 | Asada et al. | 384/107 |
| 4,596,474 | 6/1986 | Van Roemburg | 384/114 |
| 4,883,367 | 11/1989 | Maruyama | 384/114 |
| 5,112,141 | 5/1992 | Asada et al. | 384/100 |
| 5,246,294 | 9/1993 | Pan | 384/119 |

Primary Examiner—Thomas R. Hannon
Attorney, Agent, or Firm—David B. Harrison

[57] ABSTRACT

A self-replenishing hydrodynamic bearing unit comprises a shaft and housing defining an opening for receiving the shaft for relative unidirectional rotation. A plurality of reservoirs contain a lubricating fluid. A hydrodynamic bearing region lies between the plurality of reservoirs for providing a rotational journal for relative rotation between the shaft and the housing. At least one of the shaft and the housing defines a continuous pattern of herringbone or Vee-shaped pumping grooves or passages which communicate between the plurality of reservoirs for pumping the lubricating fluid during relative rotation. The groove pumping creates a pressurized hydrodynamic bearing lubricant film at the bearing region with each groove generating localized unidirectional directional flow of lubricating liquid between the reservoirs along a predetermined axial direction of rotation, wherein some passages create axial flow in a forward direction and the others create axial flow in a reverse direction. The passages are arranged so that a total of the axial flows from all of the pumping passages is essentially zero.

8 Claims, 5 Drawing Sheets (A=B)

(A<B)

SELF-REPLENISHING HYDRODYNAMIC BEARING

FIELD OF THE INVENTION

The present invention relates to fluid bearings. More particularly, the present invention relates to a self-replenishing hydrodynamic bearing which produces bi-directional, localized lubricating liquid flows generally along an axis of relative rotation of the bearing components while maintaining zero global axial flow, so that the bearing lubricant is self replenishing without being self depleting.

BACKGROUND OF THE INVENTION

Lubricant supply to hydrodynamic bearings is conventionally established by applying pressure from an external source to a lubricating liquid or gas at the bearing surface, or by centrifugal pumping of a lubricating liquid substantially uniformly into a journal between two relatively rotating members, such as a shaft and a sleeve or housing, for example. It is also conventional to establish centrifugal pumping action of the bearing by defining relief grooves or a helical groove inclined at a specified angle or angles relative to an axis or plane of rotation (as in the case of hydrodynamic thrust bearings) in one of the surfaces of the hydrodynamic bearing journal, the other surface being extremely smooth. Ideally, in the example of centrifugal pumping, unidirectional relative rotation between the shaft and the sleeve causes the lubricating liquid to be pumped into the journal and maintained therein under pressure for so long as the relative rotation is maintained.

Computer disk drives that use hydrodynamic journal bearings within disk spindle assemblies have commonly utilized one type of fluid bearing design, known in the art as a "herringbone" pattern bearing, or simply a "herringbone". This label may be attributed to a repeating, generally symmetrical pattern of Vee-shaped or chevron shaped relief grooves formed in either a shaft or in a bearing sleeve or housing. The ungrooved element has a smooth surface. Relative unidirectional rotation of the shaft and the sleeve causes the lubricating liquid to enter the legs of each Vee groove and flow toward an apex thereof, where fluid pressure from the resultant pumping action creates and maintains a hydrodynamic bearing during the relative unidirectional rotation between the shaft and its associated housing.

Almost all of the existing herringbone bearing spindle designs for self-contained bearing systems have one common characteristic, which is that they produce no lubricating liquid flow in a direction generally along an axis of relative unidirectional rotation during operation. This arrangement is provided to prevent bearing failure from starvation otherwise resulting from a net liquid pumping effect toward either side of the bearing region. Thus, these prior designs are based on the premise that the oil which originally exists in the bearing area will not be replenished during operation and any wear debris which becomes trapped within the bearing clearance between the rotating surfaces of the shaft and housing will not be carried out of it by any localized flow of the lubricating liquid. This substantially nonexistent localized flow, with its consequent entrapment of bearing wear debris, and/or old lubricant residues, etc., tends to create localized heating, wear, and breakdown of the lubricant which in turn tends to limit the useful life of the fluid bearing. Examples of this prior approach are found in Asada et al. U.S. Pat. No. 4,557,610, entitled: "Dynamic Pressure Type Fluid Bearing Device"; and, Asada et al. U.S. Pat. No. 5,112,141, entitled: "Disk Driving Apparatus".

FIG. 1 hereof illustrates in unwrap (linear) view of a conventional herringbone pumping pattern for a hydrodynamic bearing. The Vee-grooves 10 defined in a shaft 12 or a mating bearing sleeve (not shown) creates a balanced flow of lubricating liquid along legs 10A and 10B of each Vee-grove 10. An apex of each Vee-groove 10 is in line with a circular locus 15 which lies in a plane normal to an axis of relative rotation between the shaft 12 and its mating bearing sleeve. As the relative rotation proceeds in accordance with the direction of the horizontal arrow in FIG. 1, lubricating liquid enters each leg 10A and 10B of each Vee-groove 10 from respective reservoirs 16 and 18 and flows toward the apex locus 15. In this example of the prior art, each leg 10A is the same length as each leg 10B. The result is that equal flows of lubricating liquid proceed along the legs 10A and 10B from the reservoirs 16 and 18 and result in zero net flow in a direction of axial relative rotation of the bearing unit.

A variation of this prior approach is to be found in Van Roemburg U.S. Pat. No. 4,596,474, entitled: "Bearing System Comprising Two Facing Hydrodynamic Bearings". In the Van Roemburg approach, the herringbone patterns of each bearing are such that the outer legs of the Vee grooves are longer than the inner legs. This arrangement is also illustrated diagrammatically in FIG. 2 hereof. In this arrangement, the legs 10A are shorter than the legs 10B, resulting in a net axial flow toward reservoir 16 as denoted by the vertical arrows in FIG. 2 and overall pressure equilibrium. In the Van Roemburg approach, in order to replenish the lubricant along the inner legs (e.g. legs 10A of FIG. 2 hereof), another pair of oppositely threading helical feed grooves are formed on the shaft within a central reservoir region of the bearing unit. This arrangement builds up a pressure at the apex of each bearing which is greater than the pressure in the lubricating liquid built up by the inner legs and by the helical feed grooves. By providing this arrangement it is said that the lubricant is not pumped out of the bearing system. By the same token, it is not clear that this prior bearing system provides any localized circulation of bearing liquid at the bearing surfaces which would remove wear debris, spent lubricant, etc.

There have been several attempts in the prior art to provide hydrodynamic bearings which achieve a net flow of lubricating liquid in order to flush away wear debris. One example is found in U.S. Pat. No. 5,246,294 to Coda H. T. Pan, entitled: "Flow-Regulating Hydrodynamic Bearing". While this prior approach apparently achieves a net axial flow of lubricating liquid, it accomplishes this goal only with a very complicated arrangement of reservoirs, a three-way valve and multiple passages defined within the disk spindle structure, requiring complicated machining/manufacturing processes.

Thus, a hitherto unsolved need has remained for a simplified hydrodynamic bearing design which achieves unidirectional, localized lubricating liquid flows generally along an axis of relative rotation of the bearing components thereby e.g. to remove wear debris without net depletion of lubricating liquid and consequent starvation of the bearing.

SUMMARY OF THE INVENTION WITH OBJECTS

A general object of the present invention is to provide a simplified hydrodynamic bearing design which achieves localized flow of a lubricating liquid in pressure-forming grooves along an axis or plane of rotation while maintaining zero net global flow over the entire bearing surface in a manner overcoming limitations and drawbacks of prior bearing designs.

Another object of the present invention is to provide a simplified hydrodynamic bearing which is formed to remove wear debris from the bearing surface in a manner which does not deplete the lubricating liquid and result in consequent starvation of the bearing and bearing failure.

Yet another object of the present invention is to provide a simplified, self-replenishing hydrodynamic bearing which achieves bi-directional localized axial flow of lubricating liquid and substantially zero total flow by using hydrodynamic pumping action by the bearing surface features, rather than requiring separate passages for recirculating lubricant liquid flow.

A further object of the present invention is to provide a hydrodynamic bearing design which causes lubricating liquid to be exchanged between two lubricant reservoirs which sandwich a bearing region in a manner enabling replenishment of the lubricant at the bearing within the journal clearance and also carry out any wear debris and spent or contaminated lubricating liquid, thereby to prolong substantially the useful life of the bearing.

Yet a further object of the present invention is to provide a hydrodynamic bearing unit which causes lubricating liquid to be exchanged between two lubricant reservoirs spanning a hydrodynamic bearing region in a manner providing for equalized pressures at both reservoirs without the need to provide for separate pressure equalization passages therebetween.

One more object of the present invention is to provide a hydrodynamic bearing which achieves circulation of a lubricating fluid without requiring complicated fluid passages or other special structure or machining operations during manufacture to achieve the desired localized lubricating liquid circulation.

Still one more object of the present invention is to provide a simplified hydrodynamic bearing design which is simpler to manufacture, which operates reliably in any angular orientation, and which achieves superior bearing longevity over prior art fluid bearing designs.

In accordance with principles of the present invention, a self-replenishing hydrodynamic bearing unit comprises e.g. a shaft and a shaft housing defining an opening for receiving the shaft for relative unidirectional rotation. A plurality of reservoirs contain a suitable lubricating fluid. A hydrodynamic bearing region lies between the plurality of reservoirs for providing a rotational journal for relative rotation between the shaft and the housing. At least one of the shaft and the housing defines a continuous pattern of pumping grooves or passages which communicate between the plurality of reservoirs for pumping the lubricating fluid during relative rotation. The pumping creates a pressurized hydrodynamic bearing lubricant film at the bearing region and each passage generates localized axial flow along a predetermined axial direction of rotation, in an arrangement in which some passages create axial flow in a forward axial direction and other passages create axial flow in a reverse axial direction. The passages are arranged so that a total of the axial flows from all of the pumping passages is essentially zero.

Alternatively, the present invention provides a self-replenishing hydrodynamic bearing unit comprising a shaft and a shaft housing defining an opening for receiving the shaft for relative unidirectional rotation. A plurality of lubricant reservoirs contain a lubricating liquid, and a hydrodynamic bearing region is defined by the shaft and the shaft housing between the plurality of lubricant reservoirs. The shaft defines a continuous herringbone groove pattern at the hydrodynamic bearing region which has a series of groove apexes which follow an apex locus which alternates in a periodic fashion about a central circular locus of the journal region lying in a plane perpendicular to an axis of relative unidirectional rotation. This bearing unit may include a second hydrodynamic axial thrust bearing formed by a disk surface of the shaft, and a radial facing surface of shaft housing which faces the disk surface of the shaft. In the second bearing a continuous pattern of chevron grooves or spiral grooves are formed in one of the disk surface and radial facing surface. Each groove forms an apex lying along a locus which alternates periodically relative to a center circular locus of the axial thrust bearing. Lubricating liquid is supplied from two reservoirs spanning the axial thrust bearing.

These and other objects, advantages, aspects and features of the present invention will be more fully understood and appreciated by those skilled in the art upon consideration of the following detailed description of a preferred embodiment, presented in conjunction with the accompanying drawings.

DETAILED DESCRIPTION OF PREFERRED EMBODIMENTS

Figure 1:
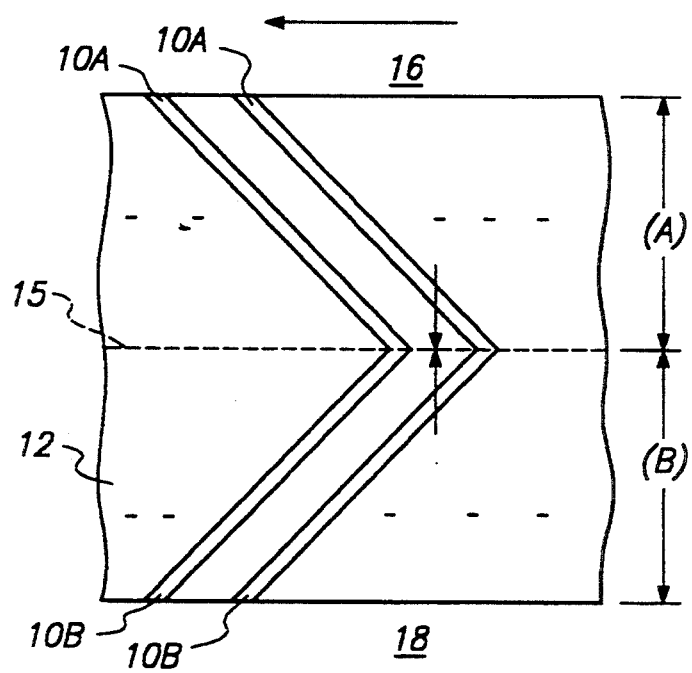
FIG. 1 is a diagrammatic "unwrap" view of a cylindrical conventional balanced herringbone hydrodynamic bearing pattern.
Figure 2:
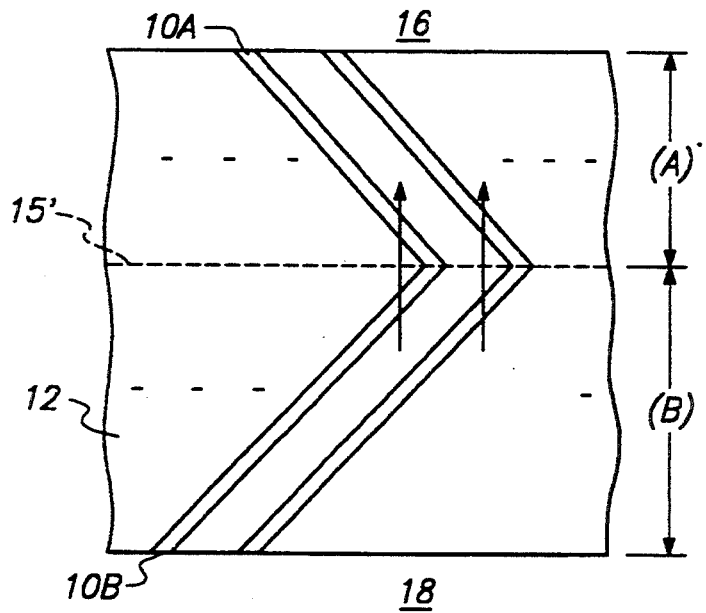
FIG. 2 is a diagrammatic "unwrap" view of a cylindrical unbalanced herringbone hydrodynamic bearing pattern in which localized axial flow occurs.
Figure 3:
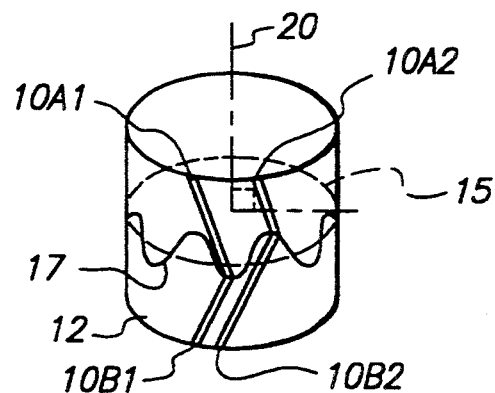
FIG. 3 is a diagrammatic orthogonal view of a self-replenishing hydrodynamic shaft bearing pattern in accordance with principles of the present invention.

FIG. 3 illustrates a herringbone centrifugal pumping pattern for a hydrodynamic bearing in accordance with principles of the present invention. In this example, an alternating locus 17 alternates in a regular or periodic fashion about the circular central locus 15 which is perpendicular to an axis 20 of relative rotation of a hydrodynamic bearing unit including the shaft 12 and a mating housing (not shown in FIG. 3). The alternating locus 17 establishes the relative lengths of the two legs 10A and 10B forming each Vee-groove of the new pattern. Thus, in one Vee-groove, a leg 10A1 is longer than another leg 10B 1, whereas the reverse is true in the next Vee-groove where leg 10A2 is slightly shorter than leg 10B2. By providing slightly unequal leg lengths along the circumference of the herringbone pattern, local axial flow of bearing lubricant is generated. By balancing the unequal leg lengths and resultant flows, global net axial flow of lubricant can be maintained as essentially nonexistent and no significant amount of lubricant is, in effect, pumped out of the hydrodynamic bearing and its associated lubricant reservoirs by virtue of the hydrodynamic action thereof.

Figure 4:
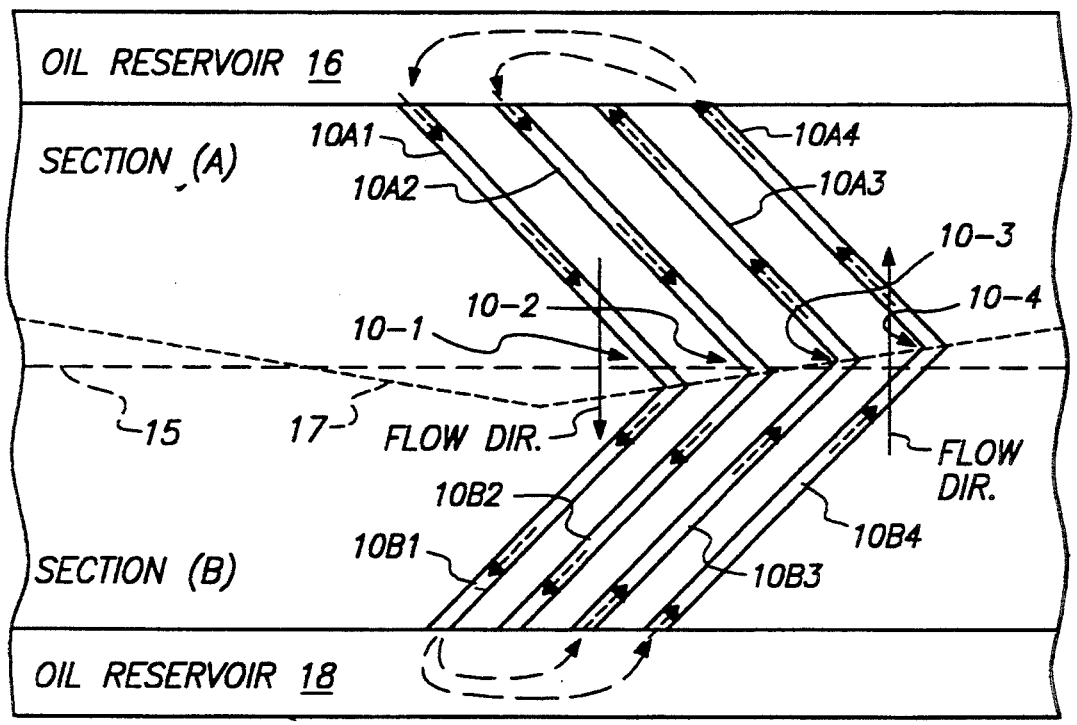
FIG. 4 is an enlarged diagrammatic "unwrap" view of the FIG. 3 self-replenishing hydrodynamic pumping pattern illustrative of balanced axial flow in accordance with principles of the present invention.

FIG. 4 illustrates four Vee-grooves 10-1, 10-2, 10-3, 10-4. These four grooves 10 extend from reservoirs 16 and 18 and have apexes along the alternating locus 17 (relative to the circular locus 15). In this example, the alternating locus line 17 dithers e.g. symmetrically about the circular locus 15, and the Vee-grooves 10 are arranged so that the sum of all local lubricant flows in the axial direction is zero. Thus, local net axial flow in the FIG. 4 example is as follows: Leg 10A1 is longer in length than leg 10B1 with resultant flow from reservoir 16 to reservoir 18. Similarly, leg 10A2 is slightly longer than leg 10B2, and a smaller net local flow proceeds from reservoir 16 to reservoir 18. On the other hand, leg 10A3 is slightly shorter than leg 10B3, with a resultant slight net flow from reservoir 18 to reservoir 16. Leg 10A4 is shorter than leg 10B4, and a resultant larger net flow occurs from reservoir 18 to reservoir 16. Thus, it can be seen in FIG. 4 that localized bi-directional axial flows of lubricant occur in relation to the unevenness of leg-lengths of the Vee-grooves 10-1, 10-2, 10-3, and 10-4. The local axial flows cause the bearing lubricant to circulate between the peripheral reservoirs 16 and 18 via the herringbone pattern Vee-grooves. This localized circulation thereby enables wear debris and lubricant residues, etc., to be flushed away from bearing surfaces, and enables lubricating liquid to be replenished with replacement lubricant displaced from the reservoirs 16 and 18 by the localized pumping action, and also prevents dirty or contaminated lubricating oil from becoming trapped within the bearing leading to lubricating liquid chemical breakdown and gumminess at the bearing surface.

Figure 5:
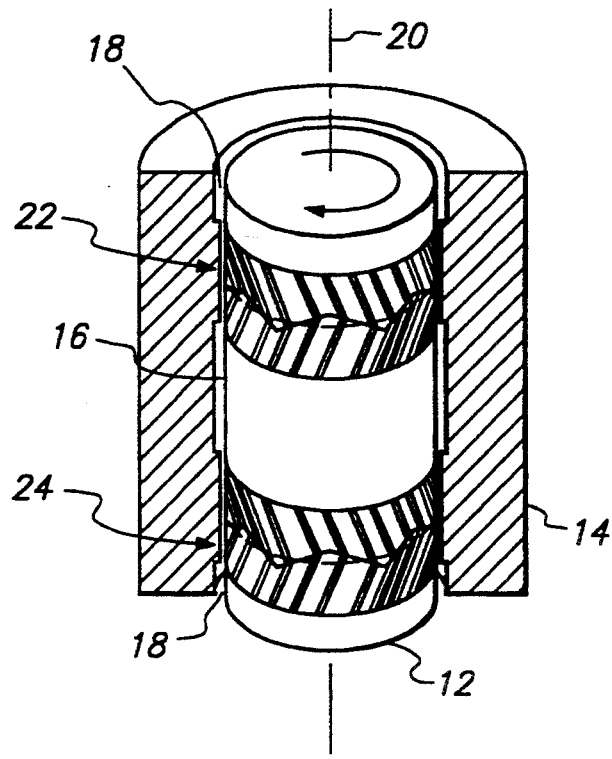
FIG. 5 is a diagrammatic orthogonal view of a dual balanced self-replenishing hydrodynamic shaft bearing unit including a patterned shaft and a bearing sleeve shown in sectional view.

FIG. 5 illustrates a self-replenishing herringbone bearing pattern applied to two bearings 22 and 24 within a bearing assembly including the shaft 12 and a bearing sleeve 14. In this example, reservoir 16 is an interior reservoir for lubricating liquid, whereas reservoirs 18 form outer reservoirs for the liquid. Suitable seals, not forming a part of the present invention, are provided beyond the reservoirs 18 to prevent unwanted loss of lubricating liquid. While the herringbone patterns are shown as formed on the shaft 12 in this example, it will be appreciated that these patterns can alternatively be formed on the raised mating surfaces of the sleeve 14 and achieve the desired self-replenishing hydrodynamic bearing.

Figure 6:
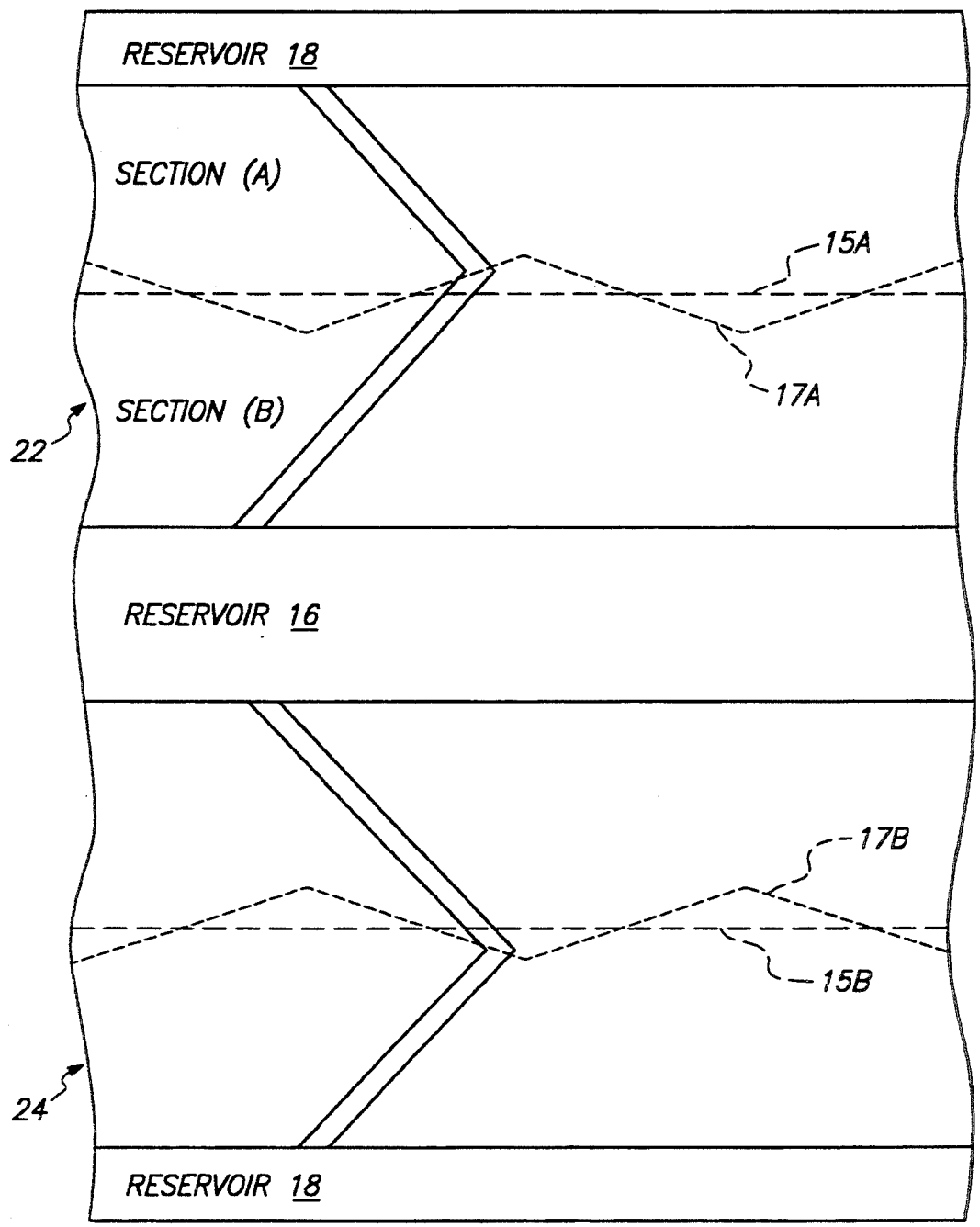
FIG. 6 is an enlarged diagrammatic "unwrap" view of the FIG. 4 bearing unit illustrating the self-replenishing hydrodynamnic pumping bearing patterns.

FIG. 6 shows a special case of the FIG. 5 bearing unit wherein the alternating locus lines 17 are out of phase with each other so that any axial force resulting from centrifugal pumping is balanced out around the bearing surfaces. Thus, the alternating locus line 17A of a top bearing pattern 22 has the same frequency and is opposite in phase with an alternating locus line 17B of a bottom bearing pattern 17B. Each alternating locus line 17A, 17B, is symmetrical about a bearing center locus 15A, 15B.

Figure 7:
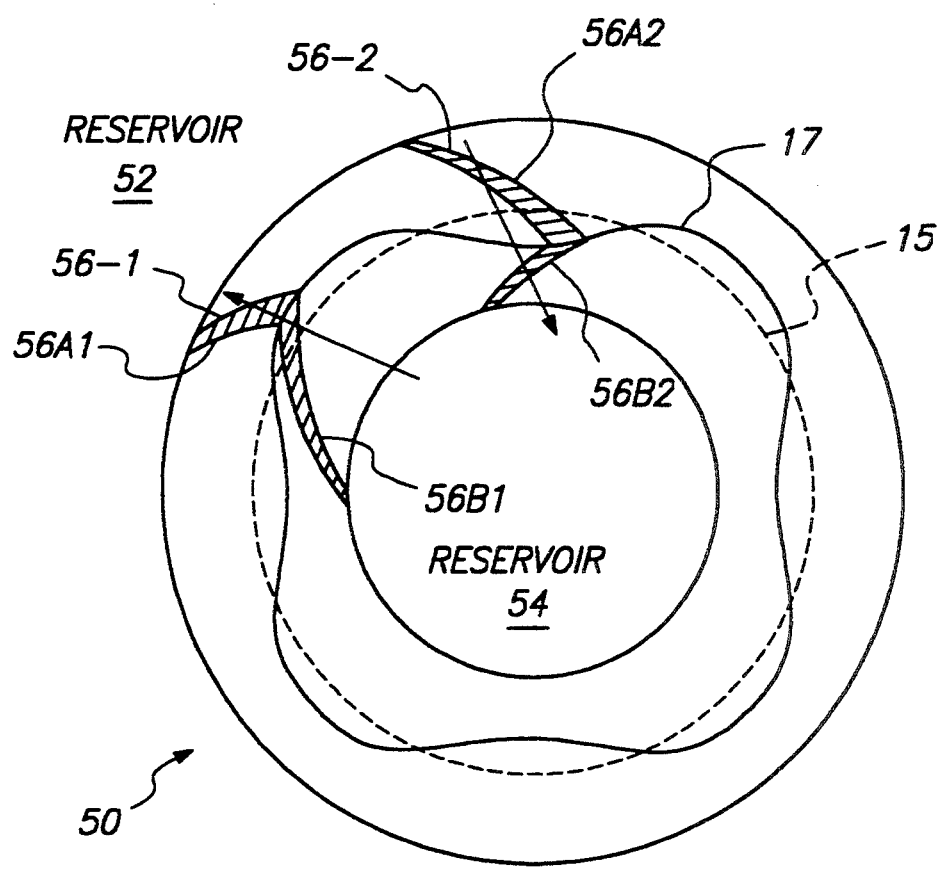
FIG. 7 is an enlarged plan view of a balanced planar flow spiral groove thrust bearing pattern in accordance with principles of the present invention.

Turning now to FIG. 7, the principles of the present invention are extended to a thrust bearing plate 50. In this example, the plate 50 includes a flat circular surface defining an outer reservoir 52, an interior reservoir 54 and a continuous curved spiral groove pattern or a discontinuous curve Vee-shape or chevron pattern in which the apex of each groove follows an undulating locus line 17 which dithers symmetrically about a central circular locus line 15. Thus, in a first spiral groove 56-1, a radially outer leg 56A1 is slightly shorter than its inner leg 56B 1 with net centrifugal pumping and flow from the inner reservoir 54 to the outer reservoir 52. In a second illustrated Vee-groove 56-2 an outer leg 56A2 is slightly longer than its inner leg 56B2, with net flow of lubricating liquid occurring from the outer reservoir 52 to the inner reservoir 54. In this arrangement, the grooves are arranged so that each groove achieves localized flow and lubricating liquid replenishment while total global radial flow of lubricating liquid is zero. Thus, the circulation of lubricating liquid between the outer reservoir 52 and the inner reservoir 54 has the same replenishing effect as is achieved in the self-replenishing cylindrical herringbone patterns illustrated in FIGS. 3–6.

Figure 8:
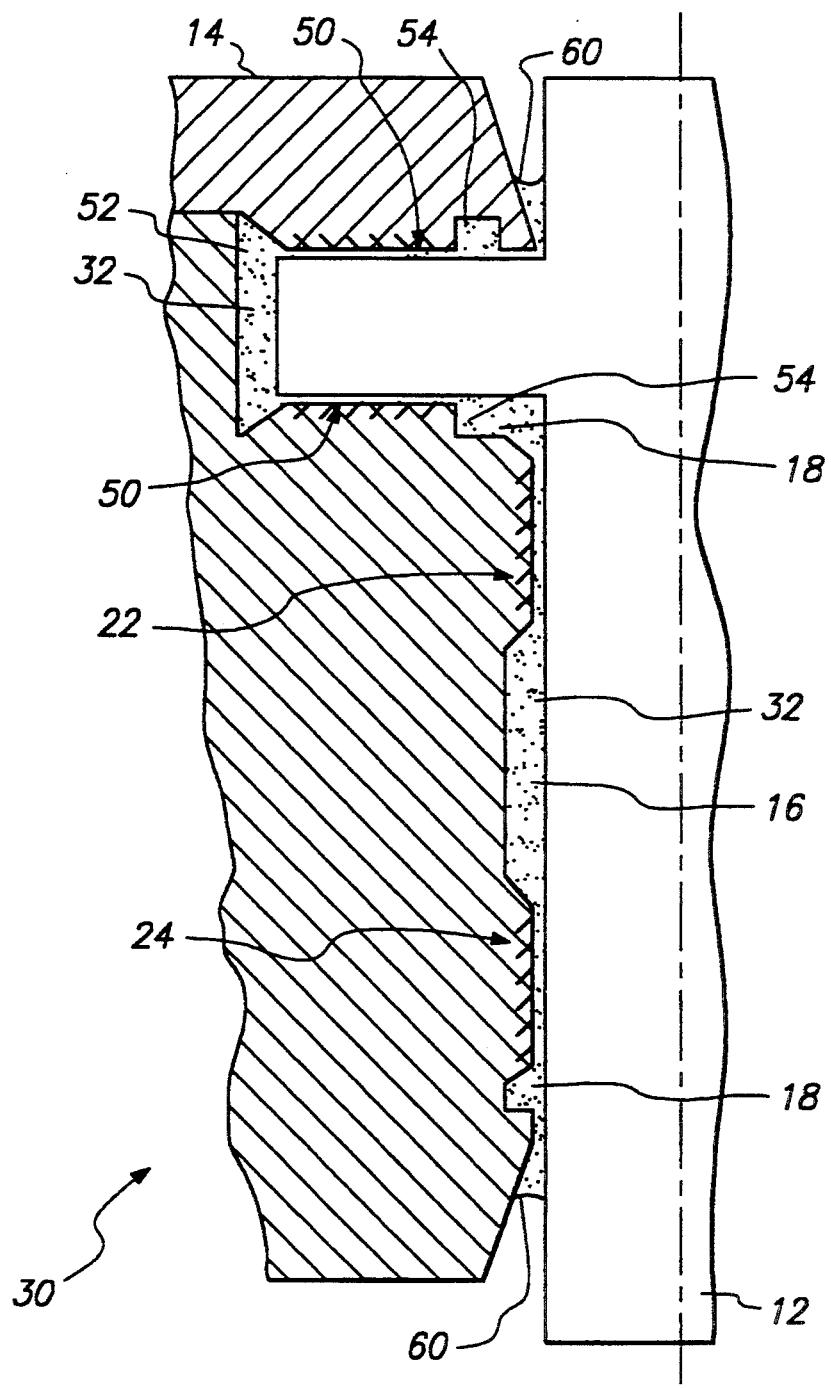
FIG. 8 is an enlarged, diagrammatic view in elevation and section of a portion of a shaft and a housing forming a hydrodynamic bearing unit incorporating the FIGS. 4 and 6 shaft bearings and the FIG. 7 thrust bearings in accordance with principles of the present invention.

FIG. 8 shows a self replenishing hydrodynamic bearing unit 30 including two shaft bearings 22 and 24 as described in conjunction with FIGS. 5–6 and two thrust bearings 50 as described in conjunction with FIG. 7. In this example, two wedge-shaped capillary seals 60 are provided at the outer peripheries of the shaft 12 and the sleeve 14 to provide self-containment of the lubricating liquid 32 illustrated herein by stippling.

The lubricating liquid 32 may be any suitable lubricant for hydrodynamic bearings. While annular, diverging wall capillary seals 60 are shown in FIG. 8, other sealing arrangements are also preferred. In particular, a sealing arrangement as described in commonly assigned, copending U.S. patent application Ser. No. 08/278,803, filed on the same date as this application and entitled: "A Self-Contained Hydrodynamic Bearing Unit", is preferred. The disclosure of that application is hereby incorporated by reference into this application. While the locus line 17 has been illustrated as curved and triangular, any suitable bearing pattern may be adopted, so long as it provides for localized flow within each bearing groove as well as minimizing global axial flow (in the example of shaft bearings) and minimizing global radial flow (in the example of thrust bearings).

The shaft 12 and sleeve 14 should have compatible coefficients of thermal expansion in order to maintain a desired lubricant film thickness between the bearing surfaces of e.g. 3–7 microinches. Accordingly, the shaft 12 may be made of a stainless or carbon steel alloy and the sleeve made of a bronze alloy; or, the shaft 12 and sleeve 14 may both be made of carbon steel, with one or both elements being suitably hardened. The bearing surfaces are most preferably finished to an ANSI surface finish of approximately 8 micro inch root-mean-square, or better. The herringbone or Vee-shaped grooves are applied by conventional micro-machining operations involving a rotary spindle and cutter, and a fourth axis rotary table for chucking the shaft or thrust plate having the surface to be machined, both cooperatively operating under computer aided manufacturing control process, for example. Electro-discharge-machining (EDM) methods may also be employed. The spiral grooves on the thrust plate surface may be formed by machining, EDM, etching or coining processes. The lubricating liquid is most preferably a low evaporation rate, low thermal breakdown lubricating oil.

To those skilled in the art, many changes and modifications will be readily apparent from consideration of the foregoing description of a preferred embodiment without departure from the spirit of the present invention, the scope thereof being more particularly pointed out by the following claims. The descriptions herein and the disclosures hereof are by way of illustration only and should not be construed as limiting the scope of the present invention which is more particularly pointed out by the following claims.

What is claimed is:

1. A self-replenishing centrifugal pumping hydrodynamic bearing unit comprising a first bearing surface and a second bearing surface, the first and second bearing surfaces defining a bearing region, at least one of the first and second bearing surfaces defining a continuous pattern of shaped grooves, lubricating liquid being provided in each groove, each groove having an apex lying along a locus which alternates periodically relative to a center circular locus of the bearing unit.

2. The self-replenishing centrifugal pumping hydrodynamic bearing unit set forth in claim 1 forming a radial bearing unit wherein the first bearing surface is formed by a shaft, and wherein the second bearing surface is formed by a shaft housing which defines an opening for receiving the shaft for relative unidirectional rotation and wherein the shaped grooves comprise a herringbone pattern.

3. The self-replenishing centrifugal pumping hydrodynamic bearing unit set forth in claim 1 forming an axial thrust bearing unit wherein the first bearing surface is a disk surface of a rotary shaft, and wherein the second bearing surface is a disk surface of a sleeve which faces the disk surface of the rotary shaft, and wherein the shaped grooves each comprise a chevron spiral pattern.

4. The self-replenishing centrifugal pumping hydrodynamic bearing unit set forth in claim 1 further comprising a pair of lubricating liquid reservoirs located adjacent to opposite ends of the bearing region, the continuous pattern of shaped grooves communicating with the pair of lubricating liquid reservoirs.

5. The self-replenishing centrifugal pumping hydrodynamic bearing unit set forth in claim 4 further comprising a pair of capillary seals, each capillary seal located adjacently outside of an adjacent one of the pair of lubricating liquid reservoirs.

6. A self-replenishing hydrodynamic bearing unit comprising a shaft and a shaft housing defining an opening for receiving the shaft for relative unidirectional rotation, a plurality of reservoirs containing a lubricating fluid, and a hydrodynamic bearing region lying between the plurality of reservoirs for providing a rotational journal for relative rotation between the shaft and the housing, at least one of the shaft and the housing defining a continuous pattern of pumping passages communicating between the plurality of reservoirs for pumping the lubricating fluid during relative rotation, each pumping passage creating localized axial flow along a predetermined axial direction, with some of the passages creating axial flow in forward axial direction and others of the passages creating axial flow in reverse axial direction, the passages being so arranged that a total of the axial flows from all of the pumping passages is essentially zero.

7. A self-replenishing hydrodynamic bearing unit comprising a shaft and a shaft housing defining an opening for receiving the shaft for relative unidirectional rotation, a plurality of lubricant reservoirs containing a lubricating liquid, a hydrodynamic bearing region defined by the shaft and the shaft housing between the plurality of lubricant reservoirs, the shaft defining a pattern of generally Vee-shaped grooves at the hydrodynamic bearing region, the pattern having a series of groove apexes which follows an apex location which alternates about a central circular locus of the journal region lying in a plane perpendicular to an axis of relative unidirectional rotation.

8. The self-replenishing hydrodynamnic bearing unit set forth in claim 7 further comprising a second hydrodynamic bearing unit comprising an axial thrust bearing formed by a disk surface of the shaft, and a radial facing surface of shaft housing which faces the disk surface of the shaft, and a continuous pattern of spiral grooves formed in one of the disk surface and radial facing surface, there being lubricating liquid in each spiral groove, each spiral groove having an apex lying along a locus which alternates periodically relative to a center circular locus of the axial thrust bearing.

* * * * *